United States Patent
Hatanaka

(10) Patent No.: US 12,220,816 B2
(45) Date of Patent: Feb. 11, 2025

(54) LEARNING DATA CONFIRMATION SUPPORT DEVICE, MACHINE LEARNING DEVICE, AND FAILURE PREDICTING DEVICE

(71) Applicant: FANUC CORPORATION, Yamanashi (JP)

(72) Inventor: Kokoro Hatanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 681 days.

(21) Appl. No.: 16/689,429

(22) Filed: Nov. 20, 2019

(65) Prior Publication Data

US 2020/0198128 A1    Jun. 25, 2020

(30) Foreign Application Priority Data

Dec. 21, 2018 (JP) ................. 2018-239773

(51) Int. Cl.
*B25J 9/16* (2006.01)
*G05B 23/02* (2006.01)
(Continued)

(52) U.S. Cl.
CPC ............ *B25J 9/163* (2013.01); *G05B 23/024* (2013.01); *G06F 16/2474* (2019.01); *G06N 5/04* (2013.01);
(Continued)

(58) Field of Classification Search
CPC .............................. G05B 23/024; B25J 9/163
See application file for complete search history.

(56) References Cited

U.S. PATENT DOCUMENTS 9,886,338 B1 * 2/2018 Khokhar ................. G06F 11/34
10,971,029 B2 * 4/2021 Tsunoi ............... G06Q 50/2057
(Continued)

FOREIGN PATENT DOCUMENTS

CN         1815395       8/2006
CN       101152699       4/2008
(Continued)

OTHER PUBLICATIONS

Machine Translation for JP-5530019-B1, obtained Sep. 2022 (Year: 2022).*

(Continued)

*Primary Examiner* — Alicia M. Choi
*Assistant Examiner* — Vi N Tran
(74) *Attorney, Agent, or Firm* — Wenderoth, Lind & Ponack, L.L.P.

(57) ABSTRACT

To facilitate confirmation as to whether or not it is data measured by the same operation upon acquiring measurement data in an industrial machine. A learning data confirmation support device 3 that facilitates confirmation of contamination of inappropriate data when learning data including only normal data are acquired in advance, in order to detect an anomaly of an industrial machine using machine learning, includes a data acquisition unit 31 that acquires measurement data including time-series data representing at least one of a predetermined state quantity or control quantity relating to control when the industrial machine is made to perform a certain operation; and a display control unit 32 that aligns a plurality of pieces of time-series data acquired by the data acquisition unit in a direction of a time axis and, in this state, superimposes a same type of pieces of data of the time-series data to display in a graph.

6 Claims, 8 Drawing Sheets

(51) Int. Cl.
 *G06F 16/2458* (2019.01)
 *G06N 5/04* (2023.01)
 *G06N 20/00* (2019.01)
(52) U.S. Cl.
 CPC ... *G06N 20/00* (2019.01); *G05B 2219/50391* (2013.01)

(56) References Cited

U.S. PATENT DOCUMENTS

| | | | | |
|---|---|---|---|---|
| 11,016,468 | B1* | 5/2021 | Barker | G05B 19/4065 |
| 11,141,126 | B2* | 10/2021 | Mori | G06T 7/20 |
| 2003/0115510 | A1* | 6/2003 | Takayama | G05B 23/0283 714/47.1 |
| 2005/0114081 | A1* | 5/2005 | Fukui | G01N 29/4445 702/182 |
| 2005/0159835 | A1* | 7/2005 | Yamada | G06Q 10/06 700/109 |
| 2012/0035765 | A1* | 2/2012 | Sato | G06F 3/015 600/300 |
| 2015/0019040 | A1* | 1/2015 | Tanaka | G05B 23/0264 700/299 |
| 2016/0291040 | A1* | 10/2016 | Koshimura | G01N 33/4905 |
| 2017/0031329 | A1* | 2/2017 | Inagaki | G06N 3/08 |
| 2017/0102696 | A1* | 4/2017 | Bell | G05B 23/0275 |
| 2017/0293862 | A1* | 10/2017 | Kamiya | G01N 29/4436 |
| 2020/0097810 | A1* | 3/2020 | Hetherington | G06N 3/0454 |

FOREIGN PATENT DOCUMENTS

| | | | | |
|---|---|---|---|---|
| CN | 106339688 | | 1/2017 | |
| CN | 106409120 | | 2/2017 | |
| CN | 107272586 | | 10/2017 | |
| CN | 108628253 | | 10/2018 | |
| CN | 108805202 | | 11/2018 | |
| JP | 2000-10620 | | 1/2000 | |
| JP | 2006-92241 | | 4/2006 | |
| JP | 4832609 | | 12/2011 | |
| JP | 2013-8111 | | 1/2013 | |
| JP | 2013008111 | A * | 1/2013 | |
| JP | 2014-59910 | | 4/2014 | |
| JP | 5530019 | B1 * | 6/2014 | |
| JP | 6140331 | | 5/2017 | |
| JP | 2017-120649 | | 7/2017 | |
| JP | 2017-188030 | | 10/2017 | |
| JP | 2017207376 | A * | 11/2017 | |
| WO | WO-2018052015 | A1 * | 3/2018 | ............. G05B 23/02 |
| WO | WO-2019181573 | A1 * | 9/2019 | ......... G05B 23/0221 |

OTHER PUBLICATIONS

Machine Translation for JP-2013008111-A, obtained Sep. 2022 (Year: 2022).*
Machine Translation for WO2018/052015 A1, obtained Sep. 2022 (Year: 2022).*
Machine Translation for WO-2019181573-A1, obtained May 2024 (Year: 2024).*
Machine Translation for JP2017207376A, obtained Nov. 2024 (Year: 2024).*
Notification of Reasons for Refusal issued Mar. 16, 2021 in Japanese Application No. 2018-239773.
Notification of Reasons for Refusal issued Aug. 3, 2021 in corresponding Japanese Patent Application No. 2018-239773.
Decision of Refusal issued Sep. 21, 2021 in corresponding Japanese Patent Application No. 2018-239773.

* cited by examiner

MOTOR CURRENT VALUE
(IN CASE WHERE INAPPROPRIATE DATA ARE NOT MIXED)

MOTOR CURRENT VALUE
(IN CASE WHERE INAPPROPRIATE DATA ARE MIXED)

MOTOR CURRENT VALUE
(IN CASE WHERE INAPPROPRIATE DATA ARE NOT MIXED
BUT INDISTINGUISHABLE)

MOTOR VELOCITY
(IN CASE WHERE INAPPROPRIATE DATA ARE NOT MIXED)

MOTOR VELOCITY
(IN CASE WHERE INAPPROPRIATE DATA ARE MIXED)

LEARNING DATA CONFIRMATION SUPPORT DEVICE, MACHINE LEARNING DEVICE, AND FAILURE PREDICTING DEVICE

This application is based on and claims the benefit of priority from Japanese Patent Application No. 2018-239773, filed on 21 Dec. 2018, the content of which is incorporated herein by reference.

BACKGROUND OF THE INVENTION

Field of the Invention

The present invention relates to a learning data confirmation support device, a machine learning device, and a failure predicting device for facilitating confirmation of whether or not inappropriate data is mixed when acquiring training data used in machine learning.

Related Art

In a six-axis robot (industrial robot) using motors as actuators, it is well known that the torque of the motor is transmitted to a robot arm through a reducer; however, in such a robot, the reducer is a component that is most susceptible to breakage (failure). In addition, failure of a spindle and a motor for driving the spindle in the machine tool are often caused by deterioration or breakage of bearings of the motor. Here, when an industrial machine including an industrial robot, a machine tool, or the like is used, for example, in a state in which a reducer is deteriorated, or in a state in which a spindle is deteriorated, the yield is greatly lowered. When the reducer, the spindle, or the like fails, it takes a long time to recover the reducer, the spindle, or the like, and a large downtime (stoppage time) occurs in industrial machines including industrial robots, machine tools, or the like, resulting in a decrease in the working rate of the industrial machines.

Therefore, in an industrial machine, if signs (deterioration) of the reducer, the spindle, or the like are detected prior to complete failure, and appropriate measures such as repairing the reducer, the spindle, or the like are taken, the downtime of the industrial machine can be drastically reduced, and the working rate of the industrial machine including industrial robots, machine tools, and the like can be improved. Therefore, in an industrial machine, it has been attempted to detect a sign of failure in a reducer, a spindle, or the like (also referred to as "anomaly detection").

For example, in the anomaly detection of an industrial machine including industrial robots and machine tools, it is known to periodically cause an industrial robot or a machine tool to perform a certain operation, to acquire time series data (e.g., motor velocity) of a control quantity relating to the control of the robot or the machine tool, time series data (e.g., motor current value, estimated disturbance value, etc.) of a state quantity of the control of the robot control or machine tool, operating environment data such as temperature (hereinafter referred to collectively as "measurement data"), etc., and to use the resulting data as learning data or diagnostic data for diagnosing a deteriorated state.

For example, Japanese Unexamined Patent Application, Publication No. 2017-188030 discloses a machine learning device capable of detecting a sign of failure of a spindle or a motor for driving the spindle of a machine tool prior to failure. More specifically, a machine learning device is a machine learning device for machine learning the failure prediction of a motor for driving a spindle or a spindle of a machine tool, and includes: a state observing unit for observing a state variable including at least one of output data of a motor control device for controlling the motor, output data of a detector for detecting the state of the motor, and output data of a measuring instrument for measuring the state of the spindle or the motor; a determination data acquisition unit for acquiring determination data for determining the presence or absence of failure or the degree of failure of the spindle or the motor; and a learning unit for learning the failure prediction of the spindle or the motor according to a data set created based on a combination of the state variable and the determination data.

Japanese Unexamined Patent Application, Publication No. 2017-120649 discloses a failure prediction system that enables accurate failure prediction according to circumstances. In particular, the failure prediction system comprises a machine learning system for learning a condition associated with the failure of a robot. The machine learning device includes a state observing unit for observing a state variable composed of output data of a sensor, internal data of control software, or calculated data obtained based on the data, etc., while the robot is operating or stationary, and a learning unit for performing machine learning in accordance with a training data set created based on a combination of the state variable and the determination data.

Patent Document 1: Japanese Unexamined Patent Application, Publication No. 2017-188030
Patent Document 2: Japanese Unexamined Patent Application, Publication No. 2017-120649

SUMMARY OF THE INVENTION

Many industrial machines including industrial robots, machine tools, and the like are manufactured so as to seldom fail, and it is often difficult to acquire data of anomalous condition as learning data. For this reason, only the measurement data in the absence of failure, that is, when the industrial robots, machine tools, and the like are operating normally, is accumulated as the learning data, and the failure condition is learned by so-called unsupervised learning. Here, unsupervised learning is a technique of training a device which learns what kind of distribution of normal data is performed by providing only normal data as input data in large quantities to the learning device, and performs compression, classification, shaping, and the like on the input data even without providing the corresponding supervised output data (label data). Features included in these data sets can be subjected to clustering, etc., to collect similar data together. The anomaly diagnosis is performed on the basis of the learning model thus obtained.

In general, in the unsupervised learning, with a certain period of time, for example, several weeks or the like as a learning period starting from immediately after the industrial robot, the machine tool, or the like is shipped or immediately after the machine tool or the like is maintained, the measurement data during this period of time is defined as normal data and learned. Specifically, the data acquisition processing of the measurement data as the normal data needs to be performed under the same conditions every time. For this reason, the data acquisition processing is usually incorporated in the operation sequence of the machine tool or the robot system, and is incorporated so as to be automatically executed at a fixed period of time, for example, before the operation of the robot or the machine tool starts or after the operation ends. In doing so, it is assumed that the measurement data are acquired each time under the same conditions and with the same operation.

However, due to a temporary setting change or the like, data may be acquired under a condition or an operation different from the normal one. For example, there are cases in which the robot is moved while visually confirming the operation of the robot and is paused midway, cases in which the robot is moved by lowering the speed override lower than usual in order to confirm the operation of the robot for safety, cases in which an abnormality occurs in another device of the same line during data acquisition and the line is stopped, so that the operation of the robot is also stopped, and the like. The measurement data acquired under such unusual conditions and operations are inappropriate as normal data, and if such data are mixed as normal data and machine learned as the normal data, there is a high possibility that the learning model obtained as a learning result will be extremely inappropriate. Therefore, before machine learning, it is necessary to confirm whether or not inappropriate data acquired under a condition or operation different from normal are mixed in the learning data, and to sort and exclude the measurement data acquired under a condition or operation different from normal. However, since there is a large amount of time-series data as the measurement data, it takes a lot of effort to compare and confirm by numerical values whether or not the time-series data have been acquired under a condition or an operation different from the usual among the measurement data.

In this regard, FIGS. 8 and 9 of Japanese Unexamined Patent Application, Publication No. 2017-188030 disclose graphs illustrating index values indicating the degree of failure in the failure prediction system along the time axis. However, there is neither a description nor a suggestion of a measure for confirming whether or not inappropriate data acquired under a different condition or operation from the normal condition or operation are mixed, and for selecting and excluding measurement data acquired under a different condition or operation from the normal condition or operation. In addition, FIGS. 7 and 8 of Japanese Unexamined Patent Application, Publication No. 2017-120649 also disclose graphs illustrating index values indicating the degree of failure in failure prediction systems along time-axis. However, similar to Japanese Unexamined Patent Application, Publication No. 2017-188030, there is neither a description nor a suggestion of a measure for confirming whether or not inappropriate data acquired under a condition or operation different from normal are mixed, and selecting and excluding the measurement data acquired under a condition or operation different from normal.

It is an object of the present invention to provide a learning data confirmation support device, a machine learning device, and a failure predicting device which facilitate confirmation of whether or not data are the data measured in the same operation when acquiring learning data in an industrial machine including industrial robots, machine tools, and the like.

According to the first aspect of the present invention, the present invention relates to a learning data confirmation support device (for example, a learning data confirmation support device 3 described later) that facilitates confirmation of contamination of inappropriate data when learning data including only normal data are acquired in advance, in order to detect an anomaly of an industrial machine (for example, a robot 1 described later) using machine learning, the learning data confirmation support device including: a data acquisition unit (for example, a data acquisition unit 31 described later) that acquires measurement data including time-series data representing at least one of a predetermined state quantity or control quantity relating to control when the industrial machine is made to perform a certain operation; and a display control unit (for example, a display control unit 32 described later) that aligns a plurality of pieces of time-series data acquired by the data acquisition unit in a direction of a time axis and, in this state, superimposes a same type of pieces of data of the time-series data to display in a graph.

According to the second aspect of the present invention, in the learning data confirmation support device according to (1) above, the time-series data are time-series data of a state quantity or a control quantity of control including at least a current value of a motor, a velocity of the motor, and an estimated disturbance value.

According to the third aspect of the present invention, the learning data confirmation support device according to (1) or (2) above further includes: a data storage unit (for example, a measurement data storage unit 361) that stores the time-series data acquired by the data acquisition unit; and a data selection unit (for example, a data selection unit 33) that excludes, from the data storage unit, time series data selected as inappropriate data from the plurality of pieces of time-series data displayed by the display control unit.

According to the fourth aspect of the present invention, a machine learning device (for example, a machine learning device 4 described later) according to the present invention is a machine learning device (for example, a machine learning device 4) communicatively connected to the learning data confirmation support device according to (3), the machine learning device including: a learning unit that performs learning by unsupervised machine learning on a basis of time-series data from which the inappropriate data are excluded by the data selection unit, the time-series data being stored in the data storage unit.

According to the fifth aspect of the present invention, a failure predicting device (for example, a failure predicting device 5 described later) according to the present invention is a failure predicting device communicatively connected to the machine learning device according to (4), the failure predicting device including: an anomaly diagnosis unit (for example, an anomaly diagnosis unit 51) that performs, in response to an input of the measurement data acquired by the data acquisition unit, anomaly diagnosis of the industrial machine on a basis of a learning model created by the learning unit.

According to the sixth aspect of the present invention, the failure predicting device according to (5) further includes: an anomaly notification unit (for example, an anomaly notification unit 52) that notifies an anomaly, in which the anomaly diagnosis unit instructs the anomaly notification unit to perform a notification on a basis of an anomaly diagnosis result of the industrial machine.

According to an embodiment of the present invention, it is possible to provide a learning data confirmation support device, a machine learning device, and a failure predicting device for facilitating confirmation of whether or not inappropriate data are mixed when acquiring training data used in machine learning.

DETAILED DESCRIPTION OF THE INVENTION

Hereinafter, embodiments of the present invention will be described in detail with reference to the drawings.

First Embodiment

Figure 1:
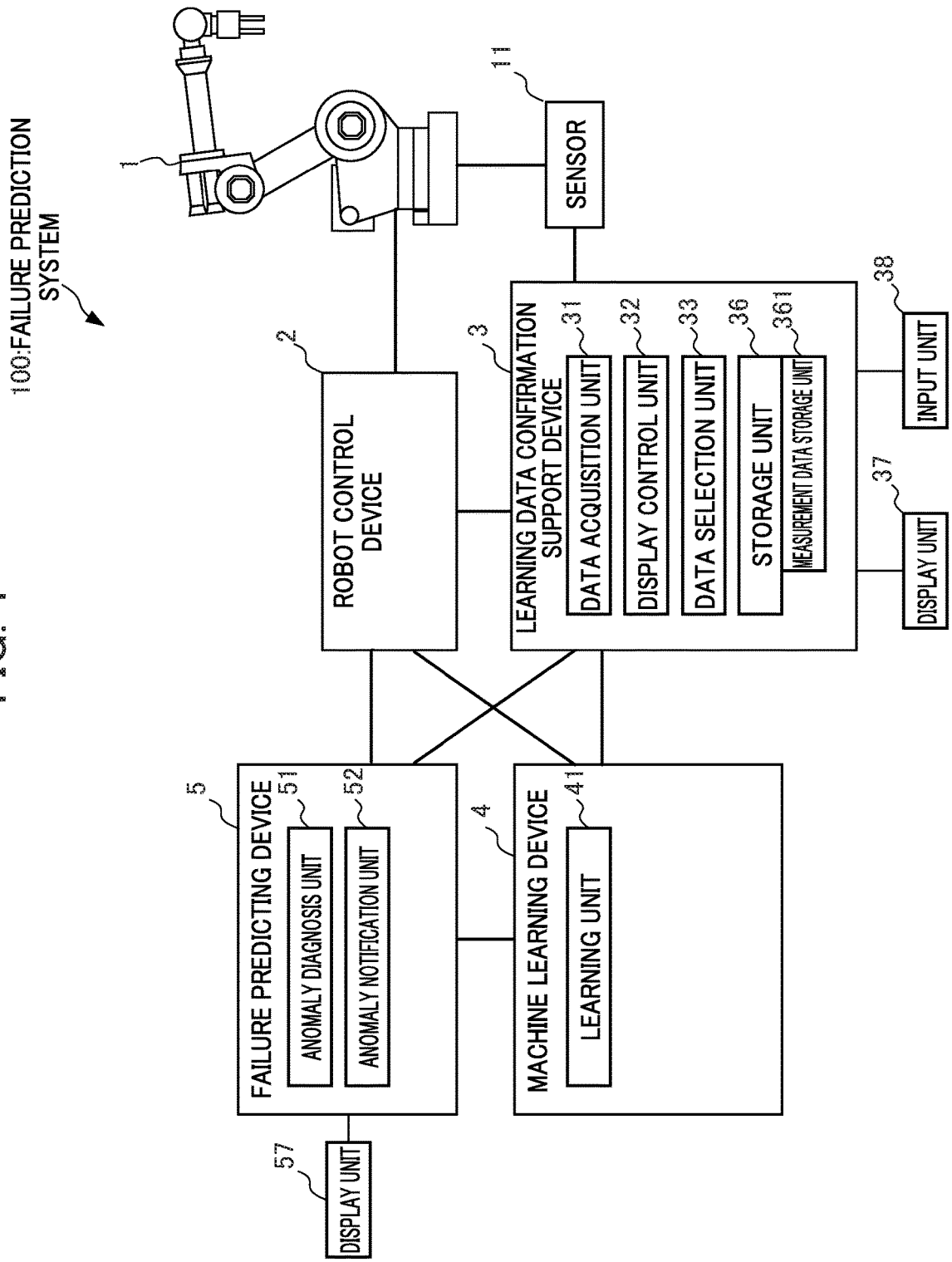
FIG. 1 is a block diagram illustrating a failure predicting system including a learning data confirmation support device according to a first embodiment of the present invention.

FIG. 1 is a block diagram illustrating an example of a failure prediction system 100 including a robot 1 as an industrial machine, a robot control device 2, a learning data confirmation support device 3, a machine learning device 4, and a failure predicting device 5. In the present embodiment, the robot 1 is exemplified as an industrial machine; however, the industrial machine in the present invention is not limited to such a robot. Industrial machines may include, for example, machine tools, industrial robots, servicing robots, and various machines controlled by a numerical control device, robot control device, or the like. In the following explanation, the learning data confirmation support device 3, the machine learning device 4, and the failure predicting device 5 used for diagnosing a failure of, for example, a drive unit of the robot 1 will be described. However, the present invention is equally applicable to any other industrial machines.

The robot 1 illustrated in FIG. 1 is, for example, a six-axis vertical multi-joint robot in which each joint is driven by a motor. The robot 1 is connected to the robot control device 2 by a known communication device. The robot control device 2 creates commands for the robot 1 in accordance with control programs. The robot control device 2 is a digital computer having a CPU, ROM, RAM, non-volatile memory, and an interface connected to an external device. Furthermore, the failure prediction system 100 may include a sensor 11 for detecting the state of the robot 1 or the surrounding environment. For example, the sensor 11 may include at least one of a temperature sensor, a humidity sensor, a vibration sensor, or a torque sensor. With such a configuration, the data acquisition unit 31, which will be described later, can acquire data outputted from the sensor 11. In the present embodiment, when an activation signal is inputted to the robot control device 2 periodically, for example, at the time of activation (prior to the start of operation), or an instruction signal for executing a predetermined program is inputted to the robot control device 2 after the end of operation, the robot control device 2 creates a command for the robot 1 according to the predetermined program and outputs the command to a drive unit (not illustrated) of the robot 1. With such a configuration, the drive unit of the robot 1 performs a certain operation under a certain condition on the basis of the command. Here, the predetermined program is, for example, a control program for a health check (also referred to as "health check program") for causing the robot 1 to perform a predetermined operation, and by driving the robot 1 using the control program, the same operation is performed every time to acquire information indicating operation characteristics of the drive unit or the like of the robot 1 during the operation (for example, time-series data of motor current values), and this acquired information is defined as learning data for machine learning of the failure prediction diagnostic learning model or failure prediction diagnostic data for use in failure prediction diagnosis of the drive unit or the like. The health check program executes a program for diagnosing an anomaly before or after line operation, in addition to the program for manufacturing, and acquires information (e.g., time-series data of motor current values) indicating operation characteristics of a drive unit and the like of the robot 1 when the same operation is performed each time. In addition, in the machine learning of the present invention, only data in a state without failure, that is, when the robot 1 is operating normally, is accumulated as learning data, and the failure condition is learned by unsupervised learning. For this reason, as the learning period for collecting the learning data, for example, a certain period is set as the learning period starting from immediately after the robot 1 is shipped, immediately after maintenance, or the like, and the learning data is acquired and accumulated. After a certain period of time has elapsed, as will be described later, a learning model (normal model) is created by performing unsupervised machine learning using learning data. Thereafter, the robot 1 is driven using predetermined programs on the same schedule as the schedule when the learning data is acquired, so that information indicating the operation characteristics of the drive unit and the like of the robot 1 during the operation of the robot 1 (for example, time-series data of motor current values) is acquired, and the acquired information is used as failure prediction diagnostic data for the failure prediction diagnosis of the drive unit and the like of the robot 1. The failure prediction diagnostic data acquired in this way is inputted to a learned model (normal model) to diagnose signs of failure. More specifically, for example, when the failure prediction diagnostic data is periodically acquired, the degree of separation from the learned model (normal model) is calculated, and it is determined whether or not the drive unit and the like of the robot 1 has an anomaly. It should be noted that the functions of the robot control device 2 are publicly well-known and will not be described in detail.

(Learning Data Confirmation Support Device 3)

As described above, the learning data confirmation support device 3 can acquire learning data for machine learning of failure prediction diagnosis learning models or failure prediction diagnostic data for use in failure prediction diagnosis such as a drive unit. In particular, the learning data confirmation support device 3 is a device for facilitating confirmation of contamination of inappropriate data when learning data including only normal data is acquired in advance, in order to detect an anomaly of a drive unit and the like of the robot 1 using machine learning. More specifically, the learning data confirmation support device 3 includes a data acquisition unit 31, a display control unit 32, a data selection unit 33, a storage unit 36, a display unit 37, and an input unit 38. The storage unit 36 includes a measurement data storage unit 361.

(Data Acquisition Unit 31)

As described above, when the robot control device 2 causes the robot 1 to perform a certain operation in accordance with the health check program according to a preset schedule or the like, the data acquisition unit 31 acquires measurement data including time-series data representing at least one of a predetermined state quantity and control quantity relating to the control when the operation is performed, and stores the acquired time-series data as learning data or failure diagnosis data in the measurement data storage unit 361 together with the acquisition time (time stamp). More specifically, the data acquisition unit 31 acquires, as learning data or failure diagnosis data, time-series data of a state quantity or a control quantity of the control including at least a current value of a motor of, for example, a drive unit, a velocity of the motor, and an estimated disturbance value of the motor during operation or a stationary state of the robot 1 by the health check program. In addition, the data acquisition unit 31 may acquire time-series data of torque, position, acceleration, jerk, and voltage values. In addition, for example, operating environment data of the temperature of the drive unit and the like, vibration data of the motor, and the like may be acquired. Hereinafter, these data are collectively referred to as "measurement data". The data acquisition unit 31 acquires the time series data of the state quantity or the control quantity of the control, i.e., the state variable, while the robot 1 is operating or stationary. In an embodiment in which the learning data confirmation support device 3 is connected to the robot 1 and the sensor 11 via the network, the data acquisition unit 31 acquires the time series data (state variable) of the state quantity or the control quantity of the control via the network.

The time series data (state variable) of the state quantity or the control quantity of the control may include the output data of the sensor 11. The time series data (state variable) of the state quantity or the control quantity of the control may include internal data of a control program for controlling the robot 1. The internal data may include at least one of torque, position, velocity, acceleration, jerk, current, voltage, and estimated disturbance value. The estimated disturbance value is, for example, a disturbance value estimated by an observer based on the torque command and the velocity feedback. The data acquisition unit 31 stores the measurement data including the time-series data (state variables) of the state amount or the control amount of the robot control acquired in this way as learning data or failure diagnosis data, together with the acquisition time (time stamp), in the measurement data storage unit 361.

(Display Control Unit 32)

Figure 2A:
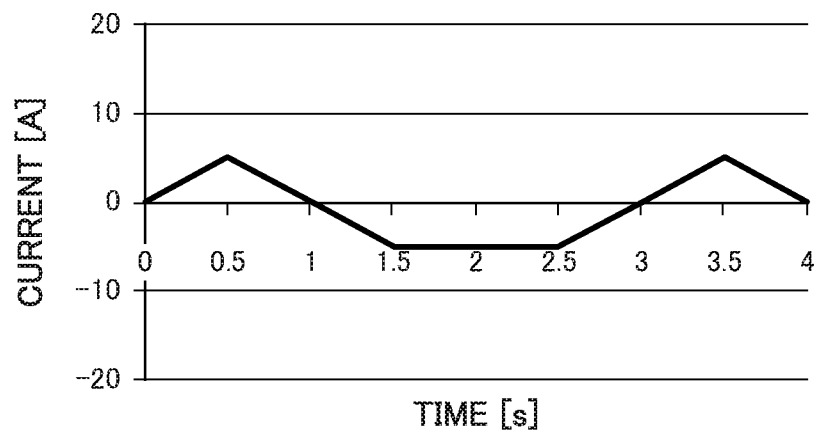
FIG. 2A is a graph showing an example in which all of the motor current values (state amount data) acquired and stored as learning data are superimposed and displayed.
Figure 2B:
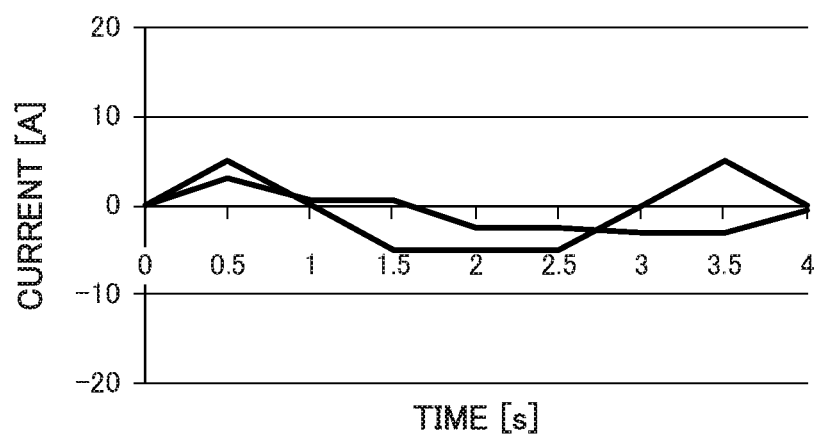
FIG. 2B is a graph showing an example in which all of the motor current values (state amount data) acquired and stored as learning data are superimposed and displayed.
Figure 3A:
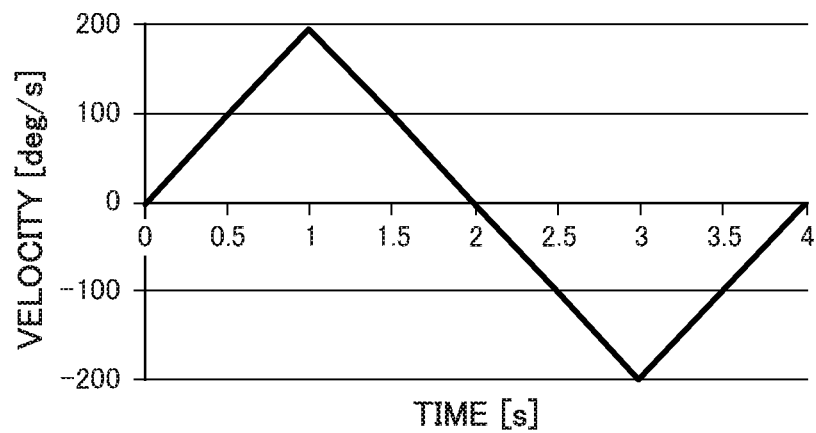
FIG. 3A is a graph showing an example in which all of the motor velocities values (control amount data) acquired and stored at the same time with learning data are superimposed and displayed.
Figure 3B:
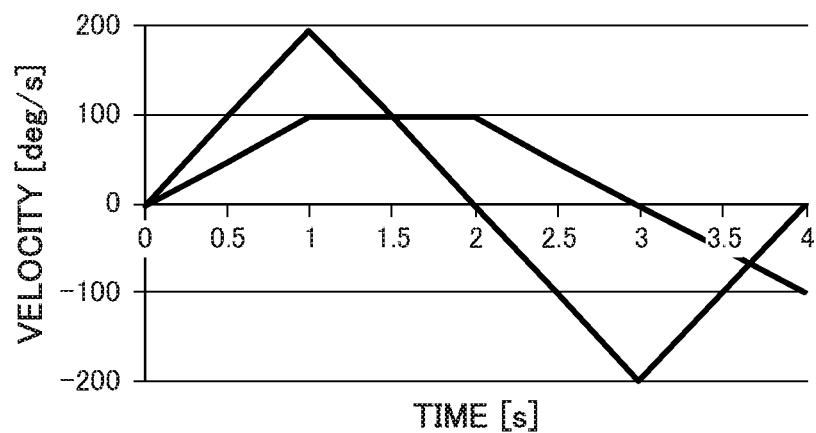
FIG. 3B is a graph showing an example in which all of the motor velocities values (control amount data) acquired and stored at the same time with learning data are superimposed and displayed.

The display control unit 32 aligns a plurality of pieces of time-series data acquired by the data acquisition unit 31 in the direction of the time axis and, in such a state, superimposes the same type of data thereof on the display unit 37 for display in a graph. More specifically, the display control unit 32 aligns the measurement data including the time-series data of each state quantity or of each control quantity of the robot control acquired within the learning period in the direction of the time axis, and displays these data in a superimposed state on the display unit 37. Here, the default value of the selected period may be the entire learning period including the measurement data stored in the measurement data storage unit 361. Hereinafter, the motor current value as one of the state quantity data and the motor velocity value as the control quantity data will be described as an example. FIG. 2A, FIG. 2B, FIG. 3A, and FIG. 3B illustrate display examples when all of the measurement data stored in the measurement data storage unit 361 are selected. FIG. 2A and FIG. 2B are diagrams illustrating examples in which all of the motor current values (state quantity data) acquired as learning data and stored in the measurement data storage unit 361 are displayed in a superimposed manner. FIG. 3A and FIG. 3B are diagrams illustrating examples in which all motor velocities values (control quantity data) acquired at the same time as the learning data and stored in the measurement data storage unit 361 are displayed in a superimposed manner. As illustrated in FIG. 2A and FIG. 3A, in a case in which no different waveforms are found and substantially overlapped when the measurement data are displayed in a superimposed manner, it can be determined that the measurement data is appropriate learning data by operating according to the operational instructions of the health check program. On the other hand, as illustrated in FIG. 2B and FIG. 3B, when different waveforms are displayed in a superimposed manner, it can be determined that the data may include inappropriate measurement data measured when the data is instructed under a condition or operation different from the operational instruction of the health check program. Here, as a case where the data is measured under a command with a condition or operation different from the operational instruction of the health check program, there is a case where the data is acquired under a condition different from the normal condition or operation by, for example, a temporary setting change or the like, as described above. As examples, there are a case in which the robot 1 is moved while visually confirming the operation of the robot 1 and is paused midway, a case in which the robot 1 is moved by lowering the speed override from the normal value for safety in order to confirm the operation of the robot 1, a case in which an abnormality occurs in another device of the same line during data acquisition and the line stops, and thus the operation of the robot 1 is also stopped, and the like.

Figure 2C:
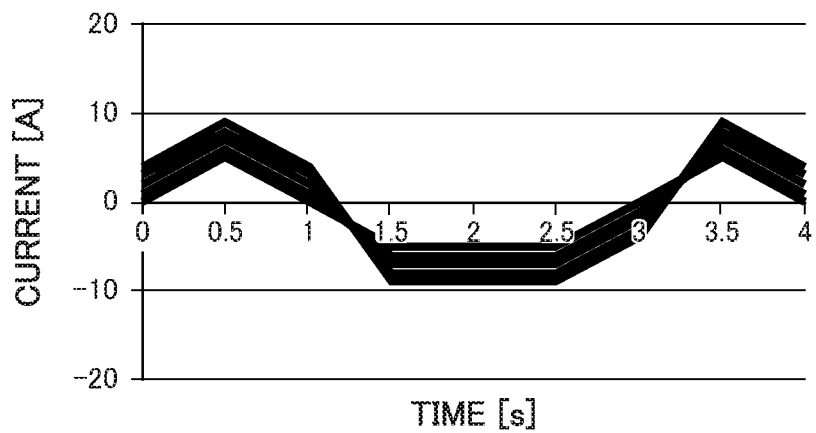
FIG. 2C is a graph showing an example in which all of the motor current values (state amount data) acquired and stored as learning data are superimposed and displayed.

However, even in the case of being time-series data acquired by the same operational instruction of the health check program, when the waveforms are displayed in a superimposed manner, different waveforms may be displayed in a superimposed manner. For example, as shown in FIGS. 2A and 2B, motor current values (state quantities) which are learning data are used as data for confirming. More specifically, since the metal parts are combined and lubricated with grease inside the reducer of the robot 1, the viscosity of the grease may vary greatly depending on the temperature. In view of the above, even when the robot 1 is periodically moved so as to reproduce the same velocity and position, the waveform of the motor current value changes under the influence of the difference in the viscosity of the grease. That is, when the viscosity of the grease changes greatly depending on the temperature, the waveform of the motor current value also changes. As described above, since the waveform of the motor current value may vary depending on the temperature, even if the waveform is time-series data acquired by the same operational instruction of the health check program, when the waveform is superimposed and displayed, there is a possibility that all of the waveforms do not overlap on one line as illustrated in FIG. 2C and different waveforms are displayed.

On the contrary, for example, in the case of a robot whose velocity is controlled, when the robot is operated in accordance with the operational instruction of the health check program, when the measured time-series data is aligned in the direction of the time axis and displayed on the display unit 37 in the state in which these data are superimposed, it is understood that all waveforms are superimposed on approximately one line as illustrated in FIG. 3A. Therefore, in such a case, for example, the display control unit 32 aligns the time-series data relating to the motor velocity, which is the control quantity, in the direction of the time axis, and displays these data on the display unit 37 in a superimposed state. Then, for example, when it is confirmed that all of the time-series data relating to the motor velocity overlaps approximately on one line, the operator can estimate that the waveform of the motor current value is the time-series data acquired by the same operational instruction of the health check program. Thus, the control quantity is relatively insensitive to disturbances such as grease viscosity. In such a case, it is possible to confirm whether or not a predetermined operation has been performed by selecting a control quantity as data for confirming whether or not the data is normal data. As described above, for example, in the robot that is subjected to the velocity control, as data for confirming the learning data, it suffices that, not the motor current value which is one of the state quantities, but the motor velocity which is the control quantity is simultaneously acquired and used.

Figure 4A:
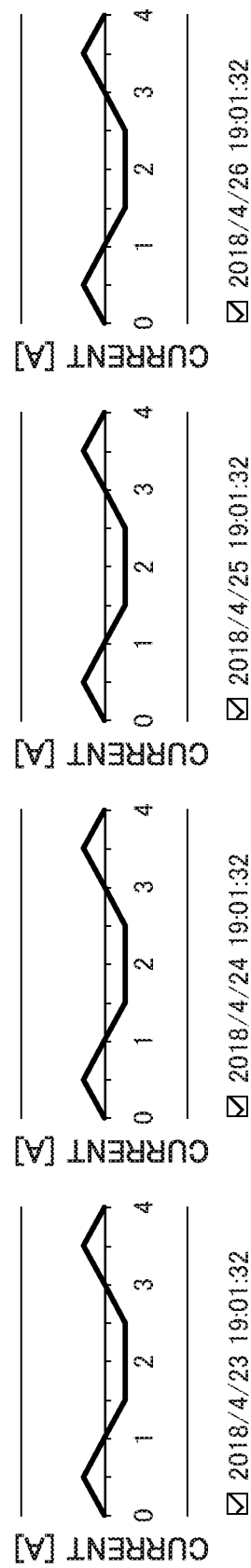
FIG. 4A is a graph showing an example in which time-series data relating to motor current values which are state amounts of robot control acquired in selected periods are positioned in the direction of the time axis, and these pieces of data are displayed in the order of the acquisition time of the data.
Figure 4B:
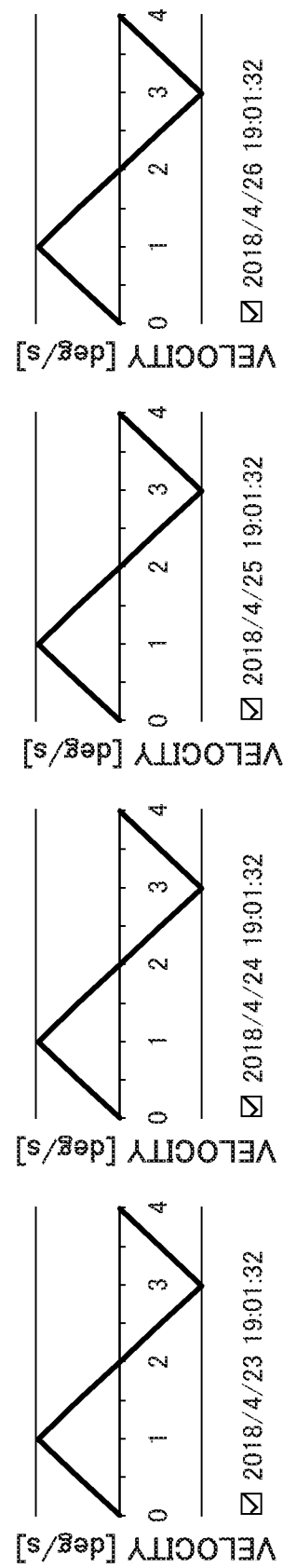
FIG. 4B is a graph showing an example in which time-series data relating to motor velocities values which are control amounts of robot control acquired in selected periods are positioned in the direction of the time axis, and these pieces of data are displayed in the order of the acquisition time of the data.

Furthermore, instead of the method of aligning a plurality of time-series data in the direction of the time axis and displaying these data in a superimposed state on the display unit 37, the display control unit 32 can align the time-series data for each state quantity or for each control quantity of the robot control acquired within the selected period in the direction of the time axis and display these data on the display unit 37 in the order of the acquisition time of the data, as illustrated in FIGS. 4A and 4B. Here, FIG. 4A illustrates an example in which time-series data relating to motor current values, which are state quantities of the robot control acquired within a selected period, are aligned in the direction of the time axis, and these data are displayed on the display unit 37 in the order of the acquisition time of the data. FIG. 4B illustrates an example in which time-series data relating to motor velocities values, which are control quantities of the robot control acquired within a selected period, are aligned in the direction of the time axis, and these data are displayed on the display unit 37 in the order of the acquisition time of the data. As illustrated in FIGS. 4A and 4B, for example, by performing scrolling processing, the operator can sequentially display each of the pieces of time-series data for each data acquisition time. With such a configuration, for example, in the case where waveforms are superimposed and displayed, when all waveforms are not superimposed on approximately one line and different waveforms are displayed, the operator can easily determine which waveforms of the time-series data acquired at which time are different. This makes it possible to visually list the learning data or the control quantity data acquired at the same time in the form of a graph waveform, thereby reducing the load on the operator relating to the confirmation operation as to whether or not the data is suitable as the learning data. As described above, in the description of the display control unit 32, the motor current value which is one of the state quantity data and the motor velocity value which is the control quantity data have been described as an example; however, the present invention is not limited thereto. For example, an estimated disturbance value may be used as the state quantity data. Here, the estimated disturbance value is an estimated value of the disturbance component estimated using the disturbance observer. Disturbance observers and disturbance estimated values are known to those skilled in the art and will not be described in detail.

(Data Selection Unit 33)

The data selection unit 33 excludes, from the measurement data storage unit 361, the time-series data which is determined to be inappropriate data as the learning data from the plurality of time-series data displayed by the display control unit 32. More specifically, when time-series data (waveforms) relating to motor velocities, which are control quantities, stored in the measurement data storage unit 361 as learning data are superimposed and displayed on the display unit 37, and when different waveforms are displayed without all waveforms overlapping on about one line, all of the measurement data corresponding to the measurement times of the waveforms selected by the operator from among these waveforms are excluded from the measurement data storage unit 361 as inappropriate data as learning data. It should be noted that, as illustrated in FIG. 4A or 4B, the data selection unit 33 may align the time-series data for each state quantity or for each control quantity of the robot control acquired as the learning data within the selected period in the direction of the time axis, and may exclude the measurement data corresponding to the waveforms selected by the operator from the measurement data storage unit 361 in a state in which these data are displayed on the display unit 37 for each time stamp. With such a configuration, it is possible to reduce the load on the operator relating to the exclusion operation of the measurement data which are inappropriate as the learning data by visually listing the learning data or the control quantity data acquired at the same time in the form of a graph waveform. The learning data confirmation support device 3 has been described above. Next, the machine learning device 4 will be described.

(Machine Learning Device 4)

As illustrated in FIG. 1, the machine learning device 4 includes a learning unit 41. As described above, unsupervised learning is assumed as the machine learning performed by the learning unit 41. The unsupervised learning is a learning method in which, unlike supervised learning in which training data including input data and labels which are data to be outputted is given and learned, input data is given but labels are not given. In the unsupervised learning, patterns and features included in input data (corresponding to measurement data groups in the present embodiment) are learned and modeled. For example, in order to perform clustering, learning models are constructed using algorithms such as the k-means method and the Ward method. Furthermore, using the learning model thus constructed, clustering is performed to automatically classify the input data given thereto without any external reference. Thus, for example, it is possible to detect a defect or a failure. As such a method of the unsupervised learning, it is possible to create a learning model (normal model) by using various methods such as, for example, the one-class SVM method, Mahalanobis-Taguchi method, and the like.

More specifically, in the event of the detection of a defect or failure of an industrial machine including robots, machine tools, and the like, the probability distribution of the respective values of the learning data, which are normal data, is estimated. Furthermore, the estimated probability distribution is used to derive the occurrence probability of the newly input measurement data. Thereafter, if the derived occurrence probability is equal to or less than a predetermined value, since the behavior of the industrial machine including the robot, the machine tool, and the like is different from the behavior thereof in the normal state, it is determined that an anomaly has occurred. That is, since the behavior of the industrial machine differs from the behavior at the time of the normal operation, it is possible to detect that the industrial machine has a defect, a failure, or a sign of a defect or a failure.

As a method of detecting an anomaly on the basis of the estimation of such a probability distribution, for example, outlier detection can be considered. In the outlier detection, an unusual outlier whose value greatly deviates from the normal data group as a target of machine learning is detected using the estimated probability distribution. For example, when the amplitude value of the vibrations is a large value far apart from the normal amplitude value, since the behavior of the industrial machine differs from the behavior at the normal state, it is possible to detect that there is a defect, a failure, or a sign of a defect or a failure in the industrial machine. It should be noted that, in the present embodiment, for example, the motor current value or the estimated disturbance value is used as the state quantity for creating the learning model (normal model); however, the present invention is not limited thereto. The machine learning device 4 has been described above. Next, the failure predicting device 5 will be described.

(Failure Predicting Device 5)

As described above, on the basis of the learned model (normal model) created by the learning data accumulated during the learning period, the failure predicting device 5 inputs failure diagnosis data acquired by the data acquisition unit 31 of the learning data confirming support device 3, for example, and outputs the anomaly diagnosis information relating to the presence or absence of an anomaly of, for example, the drive unit of the robot 1, that is, the anomaly diagnosis information as to whether or not there is a defect, a failure, or a sign of a defect or a failure. As illustrated in FIG. 1, the failure predicting device 5 includes an anomaly diagnosis unit 51 and an anomaly notification unit 52.

(Anomaly Diagnosis Unit 51)

The anomaly diagnosis unit 51 is provided with a learned model (normal model) (not illustrated) learned by the machine learning device 4, and by driving the robot 1 using a health check program, for example, to thereby input information (measurement data, for example, time-series data of motor current values) indicating operating characteristics of the drive unit or the like of the robot 1 acquired by the data acquisition unit 31 described above as failure prediction diagnostic data used for failure prediction diagnosis, it is determined, on the basis of the learned model (normal model), whether or not there is an anomaly of, for example, the drive unit of the robot 1, that is, whether or not there is a defect, a failure, or a sign of a defect or a failure. It is preferable to confirm, on the basis of control quantity data such as a motor velocity, that the measurement data acquired by the data acquisition unit 31 is appropriate as failure prediction diagnostic data, for example, prior to inputting the measurement data to the anomaly diagnosis unit 51. The anomaly diagnosis unit 51 inputs an anomaly diagnosis result to the anomaly notification unit 52, and instructs the anomaly notification unit 52 to notify the anomaly diagnosis result of the robot 1.

(Anomaly Notification Unit 52)

The anomaly notification unit 52 outputs the diagnosis information of the robot 1 to, for example, the display unit 57 on the basis of the anomaly diagnosis result by the anomaly diagnosis unit 51. With such a configuration, the failure predicting device 5 can output the anomaly diagnosis information relating to the presence or absence of an anomaly of, for example, the drive unit of the robot 1, that is, the anomaly diagnosis information as to whether there is a defect, a failure, or a sign of a defect or a failure, by inputting the failure diagnosis data on the basis of the learned model (normal model). As described above, the embodiments of the functional units of the failure prediction system 100 according to the present embodiment have been described on the basis of the configurations of the robot 1, the robot control device 2, the learning data confirmation support device 3, the machine learning device 4, and the failure predicting device 5.

Figure 5A:
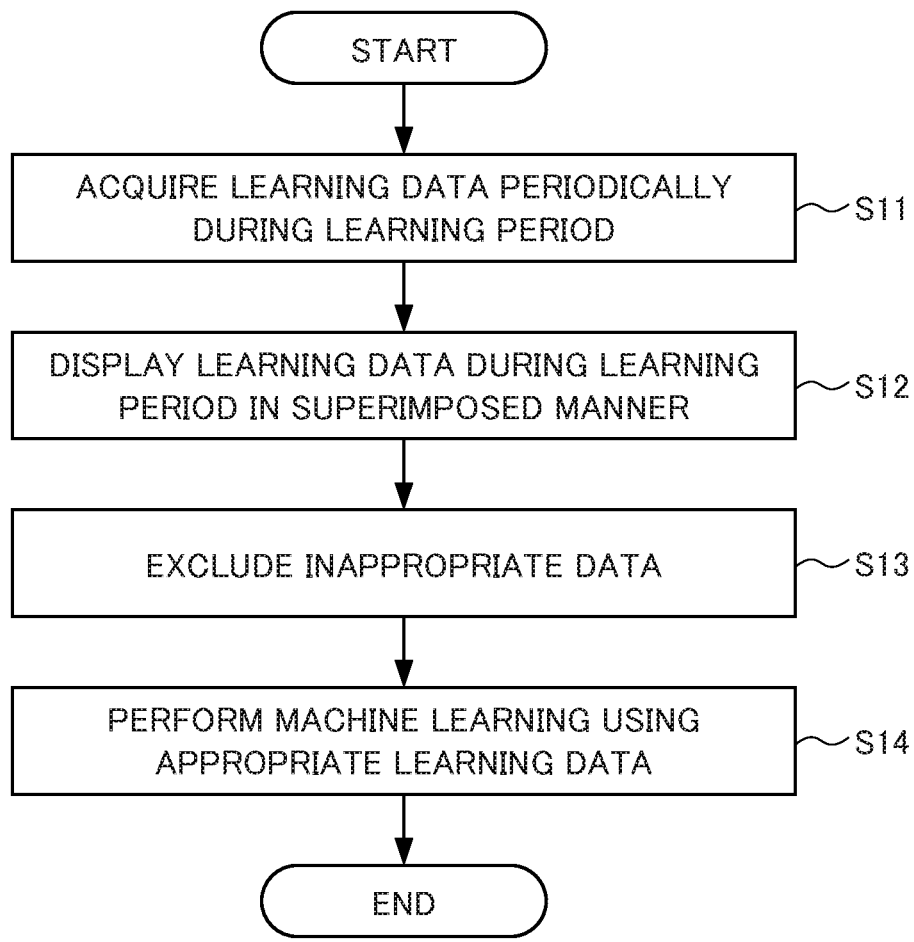
FIG. 5A is a flowchart relating to processing of creating a learning model (normal model) according to the present embodiment.
Figure 5B:
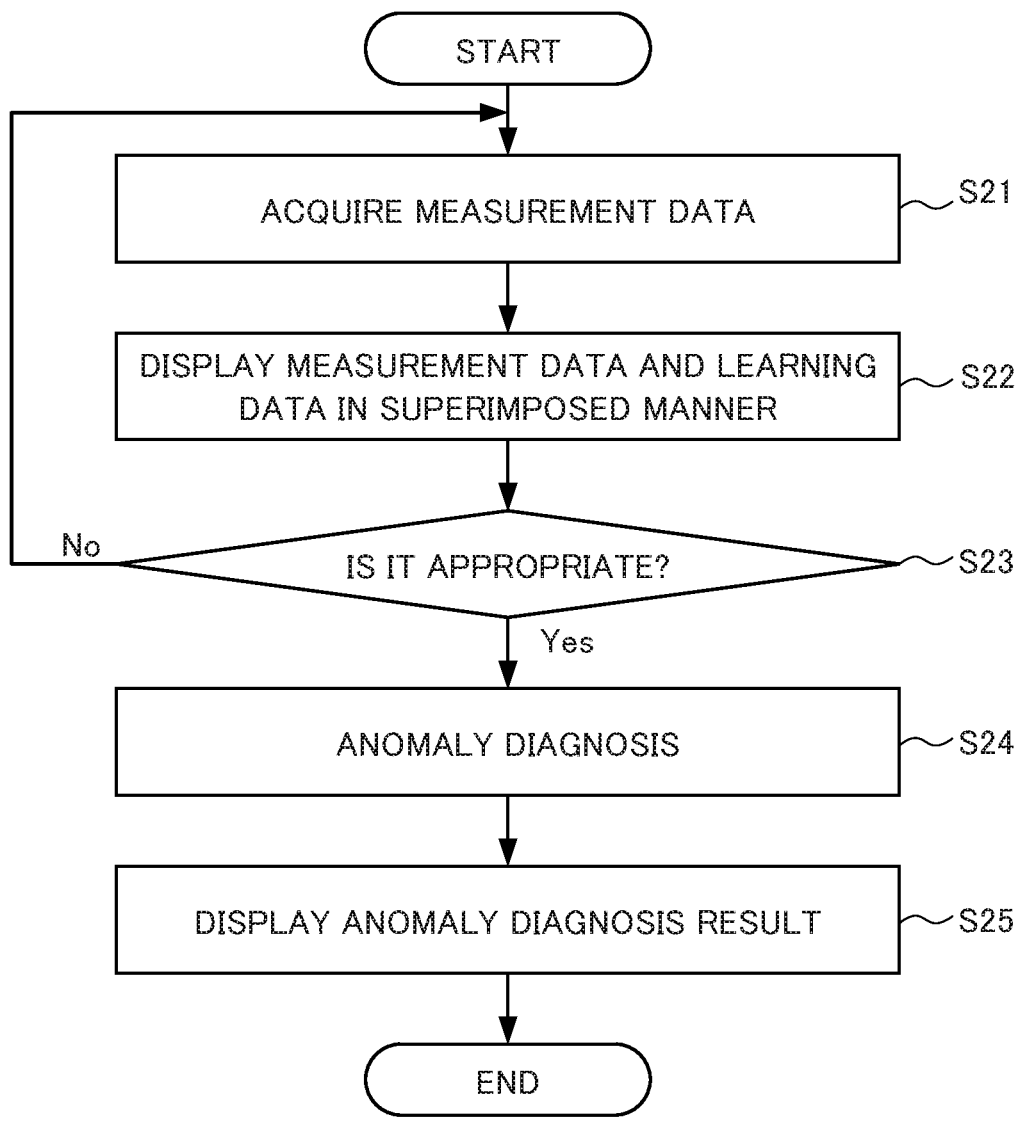
FIG. 5B is a flowchart relating to processing of performing anomaly diagnosis on a basis of the learning model after creating the learning model (normal model).

Next, with reference to the flowcharts of FIGS. 5A and 5B, the operation of the present embodiment will be described. FIG. 5A is a flowchart relating to processing until a learned model (normal model) is created. FIG. 5B is a flowchart showing processing of performing anomaly diagnosis on the basis of on a learning model after a learned model is created. The flowcharts shown in FIGS. 5A and 5B are merely examples, and the present invention is not limited thereto.

First, processing of creating learning data, performing unsupervised learning using the learning data, and creating a learning model (normal model) will be described. In Step S11, the learning data confirmation support device 3 (the data acquisition unit 31) causes the robot 1 to perform an operation according to the health check program in accordance with a preset schedule during a preset learning period, acquires measurement data including time-series data representing at least one of a state quantity and a control quantity relating to the control when the operation is performed, and stores the resulting data as learning data, together with the acquisition time, in the measurement data storage unit 361.

In Step S12, the learning data confirmation support device 3 (the display control unit 32) displays the learning data stored in the measurement data storage unit 361 in a superimposed manner according to an instruction from the operator. In Step S13, the learning data confirmation support device 3 (the data selection unit 33) excludes measurement data that are inappropriate as learning data in accordance with the instruction from the operator. In Step S14, the machine learning device 4 (the learning unit 41) performs unsupervised learning using the learning data to create a learned model (normal model) in accordance with the instruction from the operator.

Next, processing of outputting the anomaly diagnosis information relating to the presence or absence of anomaly of, for example, the drive unit of the robot 1, that is, whether or not an anomaly or failure has occurred, or whether or not there is a sign that an anomaly or failure has occurred, by inputting the failure diagnosis data after the creation of the learned model (normal model) will be described. First, in Step S21, the learning data confirmation support device 3 (the data acquisition unit 31) causes the robot 1 to perform an operation according to the health check program in accordance with a preset schedule, and acquires the measurement data including time-series data representing at least one of a state quantity and a control quantity relating to control when the operation is performed.

In Step S22, the learning data confirmation support device 3 (the display control unit 32) displays the measurement data acquired in Step S21 in a superimposed manner on the learning data stored in the storage unit 361 in accordance with the instruction from the operator.

In Step S23, the failure predicting device 5 (the anomaly diagnosis unit 51) checks whether or not the operator has determined that the measurement data acquired as the failure prediction diagnostic data are appropriate data. In a case in which it is determined that the data are appropriate (YES), the processing proceeds to Step S24. In a case in which it is determined that the data are inappropriate, the processing returns to Step S21. In a case in which it is not confirmed that the data are appropriate as the failure prediction diagnostic data, Steps S22 and S23 can be omitted.

In Step S24, the failure predicting device 5 (the anomaly notification unit 52) inputs the failure prediction diagnostic data, and performs the anomaly diagnosis on the basis of the learned model (normal model). In Step S25, the failure predicting device 5 (the anomaly diagnosis unit 51) outputs the diagnostic information of the robot 1 to the display unit 57 on the basis of the anomaly diagnosis result. The failure diagnosis is performed according to the processing flow described above, and the failure diagnosis processing ends.

The components included in the robot control device 2, the learning data confirmation support device 3, the machine learning device 4, and the failure predicting device 5 can be realized by hardware, software, or combinations thereof. Furthermore, the machine learning method performed by the cooperation of the respective constituent parts included in the learning data confirmation support device 3 and the machine learning device 4 can also be realized by hardware, software, or a combination thereof. Here, the term "realized by software" indicates being realized by a computer reading and executing programs.

The programs may be stored and supplied to the computer using various types of non-transitory computer readable medium. Non-transitory computer-readable media include various types of tangible storage medium. Examples of non-transitory computer-readable media include magnetic recording media (e.g., flexible disks, hard disk drives), magneto-optical recording media (e.g., magneto-optical disks), CD-ROM (Read Only Memory, CD-R, CD-R/W, semiconductor memories (e.g., masked ROM, PROM (Programmable ROM, and EPROM (Erasable PROM), flash ROM, and RAM (random access memory). The programs may also be supplied to the computer by various types of transitory computer readable media.

As described above, according to the present embodiment, by the learning data confirmation support device 3, the measurement data including the time-series data for each state quantity or for each control quantity of the robot control are aligned in the direction of the time axis, and displayed on the display unit 37 so that the measurement data can be visually listed in a graph waveform in a state in which these data are superimposed. As a result, whether each of the pieces of the measurement data is appropriate or inappropriate as learning data is visualized. With such a configuration, the operator can easily determine and exclude data that are inappropriate as the learning data. As a result, the machine learning device 4 can construct an appropriate learned model (normal model) by performing unsupervised learning using, as learning data, the measurement data in a state without failure, i.e., the measurement data in which only data indicating operating characteristics when the robot 1 is operating normally are accumulated. After the creation of an appropriate learned model (normal model), the failure predicting device 5 determines the degree to which the regularly acquired measurement data is isolated from the learned model (normal model), thereby making it possible to determine whether or not there is an anomaly in the drive unit and the like of the robot 1, that is, whether or not there is a defect, a failure, or a sign of a defect or a failure.

Although the above-described embodiment is a preferred embodiment of the present invention, the present invention is not limited to the above-described embodiment, and can be implemented in a form arrived at by conducting various modifications of a scope not departing from the gist of the present invention.

Modification Example 1

In the embodiment described above, an industrial robot including a robot and a robot control device is exemplified as the industrial machine; however, the present invention is not limited thereto. For example, various types of machine tools and numerical control device may be used as industrial machine.

Modification Example 2

In the embodiment described above, the robot control device 2, the learning data confirmation support device 3, the machine learning device 4, and the failure predicting device 5 are established as respectively independent devices; however, the present invention is not limited thereto. For example, the robot control device 2 may include the learning data confirmation support device 3, the machine learning device 4, and the failure predicting device 5. Furthermore, the robot control device 2 may include the failure predicting device 5. The robot control device 2 may include at least one of the learning data confirming support device 3, the machine learning device 4, and the failure predicting device 5. In any event, the inclusion relationship of these devices is merely a design matter for those skilled in the art. Furthermore, a distributed processing system may be adopted in which the functions of the robot control device 2, the learning data confirmation support device 3, the machine learning device 4, and the failure predicting device 5 may be distributed to one or more servers.

Modification Example 3

In the embodiment described above, the measurement data are inputted to the machine learning device 4 (the learning unit 41) as learning data to create the learned model (the normal model); however, the present invention is not limited thereto. The machine learning device 4 includes, for example, a frequency analysis unit (not illustrated), and extracts a frequency spectrum by performing Fourier transformation on a measurement data group stored in the measurement data storage unit 361. Furthermore, the learning unit 41 may create the learning model (the normal model) on the basis of the feature data by performing the machine learning using the frequency spectrum.

EXPLANATION OF REFERENCE NUMERALS 100 failure prediction system
1 robot
11 sensor
2 robot control device 3 learning data confirmation support device
31 data acquisition section
32 display control unit
33 data selection section
36 storage unit
361 measurement data storage unit
37 display unit
38 input unit
4 machine learning device
41 learning unit
5 failure predicting device
51 anomaly diagnosis unit
52 anomaly notification unit

What is claimed is:

1. A learning data confirmation support device for confirming contamination of inappropriate data caused by a factor including at least a different setting value or a different operation from a normal one when learning data including only normal data are acquired in advance, in order to detect an anomaly of an industrial machine using machine learning, the learning data confirmation support device comprising:
   a data acquisition unit that acquires measurement data including time-series data representing at least one of a predetermined state quantity or control quantity relating to control when the industrial machine is made to execute a control program for a health check by performing a predetermined operation according to a preset schedule and under a preset condition;
   a display control unit that aligns a plurality of pieces of the time-series data acquired by the data acquisition unit in a direction of a time axis, and superimposes a same parameter of measurement data acquired at different times from the plurality of pieces of data of the time-series data as separate waveforms in a graph that is displayed, thereby confirming the contamination of the inappropriate data by visually listing the learning data in the form of the graph and comparing the separate waveforms;
   a data storage unit that stores the time-series data acquired by the data acquisition unit; and
   a data selection unit that excludes, from the data storage unit, time series data determined as inappropriate data as learning data from the plurality of pieces of time-series data displayed in the graph by the display control unit,
   wherein the inappropriate data as learning data is determined from any waveform among the separate waveforms that do not overlap on a line, and the data selection unit excludes the measurement data that corresponds to the waveforms that do not overlap on the line as the inappropriate data as the learning data.

2. The learning data confirmation support device according to claim 1, wherein the time-series data are time-series data of a state quantity or a control quantity including at least a current value of a motor, a velocity of the motor, and an estimated disturbance value.

3. A machine learning device communicatively connected to the learning data confirmation support device according to claim 1, the machine learning device comprising:
   a learning unit that performs learning by unsupervised machine learning on a basis of time-series data from which the inappropriate data are excluded by the data selection unit, the time-series data being stored in the data storage unit.

4. A failure predicting device communicatively connected to the machine learning device according to claim 3, the failure predicting device comprising:
   an anomaly diagnosis unit that performs, in response to an input of the measurement data acquired by the data acquisition unit, anomaly diagnosis of the industrial machine on a basis of a learning model created by the learning unit.

5. The failure predicting device according to claim 4, further comprising:
   an anomaly notification unit that notifies an anomaly,
   wherein the anomaly diagnosis unit instructs the anomaly notification unit to perform a notification on a basis of an anomaly diagnosis result of the industrial machine.

6. The learning data confirmation support device according to claim 1, wherein the same parameter of measurement data acquired at the different times includes a current value of a motor, a velocity of a motor, or an estimated disturbance value.

* * * * *